(12) United States Patent
Liao et al.

(10) Patent No.: US 10,664,060 B2
(45) Date of Patent: May 26, 2020

(54) MULTIMODAL INPUT-BASED INTERACTION METHOD AND DEVICE

(71) Applicant: HISCENE INFORMATION TECHNOLOGY CO., LTD, Shanghai (CN)

(72) Inventors: Chunyuan Liao, Shanghai (CN); Rongxing Tang, Shanghai (CN); Mei Huang, Shanghai (CN)

(73) Assignee: HISCENE INFORMATION TECHNOLOGY CO., LTD., Shanghai (CN)

(*) Notice: Subject to any disclaimer, the term of this patent is extended or adjusted under 35 U.S.C. 154(b) by 24 days.

(21) Appl. No.: 16/044,335

(22) Filed: Jul. 24, 2018

(65) Prior Publication Data
US 2018/0329512 A1    Nov. 15, 2018

Related U.S. Application Data

(63) Continuation of application No. PCT/CN2017/078225, filed on Mar. 25, 2017.

(30) Foreign Application Priority Data

Jan. 25, 2016    (CN) .......................... 2016 1 0049586

(51) Int. Cl.
     *G06F 3/033*      (2013.01)
     *G06F 3/01*      (2006.01)
     (Continued)

(52) U.S. Cl.
     CPC ................ *G06F 3/017* (2013.01); *G06F 3/01* (2013.01); *G06F 3/012* (2013.01); *G06F 3/167* (2013.01);
     (Continued)

(58) Field of Classification Search
CPC . G06F 3/01; G06F 3/011; G06F 3/012; G06F 3/017; G06F 3/0487; G06F 3/167;
(Continued)

(56) References Cited

U.S. PATENT DOCUMENTS 5,712,658 A * 1/1998 Arita ................... G06F 3/03542
                                                  345/158
6,515,669 B1 * 2/2003 Mohri ..................... G06F 3/014
                                                  345/418
(Continued)

FOREIGN PATENT DOCUMENTS

| CN | 102824092 A | 12/2012 |
|---|---|---|
| CN | 103412640 A | 11/2013 |

(Continued)

*Primary Examiner* — Joe H Cheng
(74) *Attorney, Agent, or Firm* — Kilpatrick Townsend & Stockton LLP

(57) ABSTRACT

An object of the present disclosure is to provide a method for interacting based on multimodal inputs, which enables a higher approximation to user natural interaction, comprising: acquiring a plurality of input information from at least one of a plurality of input modules; performing comprehensive logic analysis of the plurality of input information so as to generate an operation command, wherein the operation command has operation elements, the operation elements at least including an operation object, an operation action, and an operation parameter; and performing a corresponding operation on the operation object based on the operation command.

12 Claims, 5 Drawing Sheets acquire a plurality of input information from at least one of a plurality of input modules, the plurality of input modules including: an image input module, a voice input module, a touch input module, and a sensing input module, the plurality of input information including at least any one of: real scene information, virtual scene information, gesture information, voice information, touch information, and sensing information — S11 perform comprehensive logic analysis of the plurality of input information to generate an operation command, wherein the operation commend has operation elements, the operation elements at least including an operation object, an operation action, and an operation parameter — S12 perform a corresponding operation on the operation object based on the operation — S13

(51) Int. Cl.
*G06K 9/00* (2006.01)
*G06K 9/62* (2006.01)
*G10L 15/26* (2006.01)
*G06F 3/16* (2006.01)

(52) U.S. Cl.
CPC ....... *G06K 9/00355* (2013.01); *G06K 9/6254* (2013.01); *G06K 9/6273* (2013.01); *G06K 9/6289* (2013.01); *G10L 15/265* (2013.01)

(58) Field of Classification Search
CPC ............. G06K 9/00355; G06K 9/6273; G06K 9/6288; G06K 9/6289
See application file for complete search history.

(56) References Cited

U.S. PATENT DOCUMENTS

| | | | | |
|---|---|---|---|---|
| 8,570,378 | B2* | 10/2013 | Zalewski | A63F 13/06 348/169 |
| 9,381,424 | B2* | 7/2016 | Zalewski | A63F 13/211 |
| 9,405,415 | B2* | 8/2016 | Morein | G06F 3/0416 |
| 9,778,735 | B2* | 10/2017 | Fukuchi | H04N 5/4403 |
| 10,126,828 | B2* | 11/2018 | Amento | G06F 3/017 |
| 10,281,991 | B2* | 5/2019 | Baldwin | G06F 3/017 |
| 10,338,678 | B2* | 7/2019 | Elangovan | G06F 3/017 |
| 2010/0194694 | A1* | 8/2010 | Kraft | G06F 3/04883 345/173 |
| 2012/0169660 | A1* | 7/2012 | Seo | G06F 1/3262 345/174 |
| 2016/0170479 | A1* | 6/2016 | Fukuchi | H04N 5/4403 345/156 |
| 2016/0186635 | A1* | 6/2016 | Won | F01N 3/2066 60/274 |
| 2017/0123646 | A1* | 5/2017 | Woo | G06F 3/013 |
| 2018/0357978 | A1* | 12/2018 | Liao | G06F 3/01 |

FOREIGN PATENT DOCUMENTS

| | | | | |
|---|---|---|---|---|
| CN | 103793060 A | 5/2014 | | |
| CN | 104238726 A | 12/2014 | | |
| WO | WO 2017/129149 A1 * | 8/2017 | | G06F 3/01 |

* cited by examiner

MULTIMODAL INPUT-BASED INTERACTION METHOD AND DEVICE

CROSS REFERENCE TO RELATED APPLICATIONS

This application is a continuation of PCT/CN2017/078225 filed 2017 Mar. 25, which claims priority to CN 201610049586.X filed 2016 Jan. 25, both of which are incorporated herein by reference.

TECHNICAL FIELD

Embodiments of the present disclosure relate to an augmented reality technology in the computer field, and more particularly relate to an augmented reality smart eyewear technology.

BACKGROUND

Augmented reality (AR) is an innovative human-machine interaction technology in a sub-field of natural picture recognition technologies, which overlays in real time digital information such as a virtual 3D animation, a video, a text, and a picture to a real scene and displays to realize a natural interaction with a real object or a user. The augmented reality highlights a natural human-machine visual interaction with fusion of virtuality and reality. The augmented reality technology covers new technologies and new means such as multimedia, 3D modeling, real-time video display and control, multi-sensor fusion, real-time tracking and registration, scene fusion, etc. The advanced and novel nature of the augmented reality technology causes its applications and promotions ever stagnant.

In the era of Mobile Internet, a core technical problem for human-machine interaction is how to connect between a current offline real scene and online virtual information and interaction in an efficient, simple, and natural manner.

In the prior art, the core for implementing a connection technology is a computer's perception of an offline object, including detection, recognition, and tracking. There are substantially two means for implementing such perception: manually labelling the offline object, or automatically recognizing the offline object by a computer. The former includes technologies such as two-dimensional code, NFC, and WiFi positioning, etc., which are required to modify each target object and thus have drawbacks such as limited functions, high costs in deployment and maintenance, unnatural interaction, and lack of intuition and aesthetics, etc. The latter is based on a natural picture recognition technology to perform intelligent analysis of image data acquired by a camera, automatically determine the identity, category, space posture and other information of the object, which requires no change to the target object and thus is more approximate to natural interaction of human.

Therefore, it has become a mainstream task in the industry how to implement a better user interaction experience with a linking between online information and offline information and a fusion of virtuality and reality.

SUMMARY

An object of the present disclosure is to provide a smart eyewear apparatus and method, which enables a higher approximation to user natural interaction.

According to one aspect of the present disclosure, there is provided a method for a smart eyewear apparatus to interact based on multimodal inputs, comprising:

A. acquiring a plurality of input information from at least one of a plurality of input modules, the plurality of input modules including: an image input module, a voice input module, a touch input module, and a sensing input module, the plurality of input information including at least any one of: real scene information, virtual scene information, gesture information, voice information, touch information, and sensing information;

B. performing analysis of the plurality of input information to generate an operation command, wherein the operation command has operation elements, the operation elements at least including an operation object, an operation action, and an operation parameter; and C. performing a corresponding operation on the operation object based on the operation command.

Further, the method further comprising:

D. acquiring relevant information of an operation command to be set by the user and updating the operation command based on the relevant information of the to-be-set operation command.

Further, the step B comprises: transmitting the plurality of input information to a split-mount control device to perform comprehensive logic analysis so as to generate the operation command, wherein the split-mount control device is physically separated from a body of the smart eyewear apparatus and is in communication connection with the smart eyewear apparatus in a wired or wireless manner.

According to another aspect of the present disclosure, there is provided a smart eyewear apparatus to interact based on multimodal inputs, comprising:

a first device configured for acquiring a plurality of input information from at least one of a plurality of input modules, the plurality of input modules including: an image input module, a voice input module, a touch input module, and a sensing input module, the plurality of input information including at least any one of: real scene information, virtual scene information, gesture information, voice information, touch information, and sensing information;

a second device configured for performing analysis of the plurality of input information to generate an operation command, wherein the operation command has operation elements, the operation elements at least including an operation object, an operation action, and an operation parameter; and a third device configured for performing a corresponding operation on the operation object based on the operation command.

Further, the smart eyewear apparatus comprising: a split-mount control device configured for acquiring a plurality of the input information and performing comprehensive logic analysis to generate the operation command, wherein the split-mount control device is physically separated from a body of the smart eyewear apparatus and is in communication connection with the smart eyewear apparatus in a wired or wireless manner.

Compared with the prior art, the method for the smart eyewear apparatus to interact based on multimodal interaction and the smart eyewear apparatus according to the present disclosure enables a user to interact in a way more approximate to a natural language to thus improve user interaction experience by: acquiring multi-channel input information with a plurality of input modules, performing comprehensive logical analysis on the input information to determine operation elements such as an operation object, an operation action, and an operation parameter, so as to generate an operation command, and then performing a corresponding operation based on the operation command, thereby performing in real time fusion processing to real scene information, virtual scene information, gesture information, voice information, touch information, and sensing information.

Further, the user may autonomously define an interaction operation by acquiring relevant information of an operation command to be set by the user and updating the operation command based on the relevant information of the to-be-set operation command, which improves use flexibility for the user.

Further, by providing a physically detached split-mount control device that is in communication connection with the smart eyewear apparatus in a wired or wireless manner, such that the processing core business logic of the smart eyewear apparatus is run by the split-mount control device, the smart eyewear apparatus may become smaller in size and lighter in weight; besides, use discomfort for users caused by over heat radiation of the smart eyewear apparatus may be avoided.

BRIEF DESCRIPTION OF THE DRAWINGS

Other features, objectives, and advantages of the present disclosure will become more apparent through reading the detailed description of the non-limiting embodiments with reference to the drawings below.

In the drawings, like or similar reference numerals represent like or similar components.

DETAILED DESCRIPTION OF EMBODIMENTS

Figure 1:
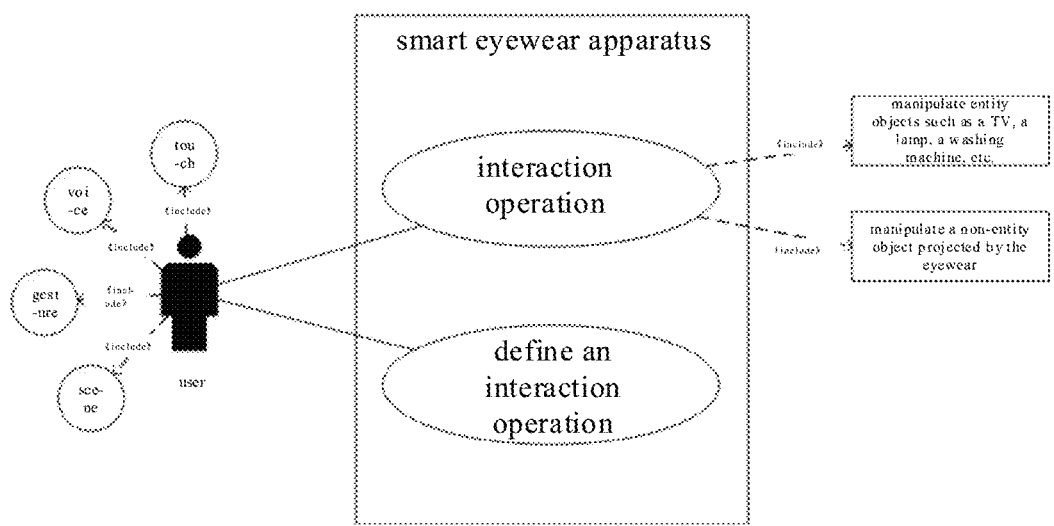
FIG. 1 shows a functional schematic diagram of a smart eyewear apparatus provided according to one aspect of the present disclosure.

Hereinafter, the present disclosure will be described in further detail with reference to the accompanying drawings:

With reference to FIG. 1, an object of the present disclosure is to provide a smart eyewear apparatus to perform comprehensive processing to multimodal inputs (e.g., input information like voice, touch, gesture, scene, and etc.), including determining an operation command for an interaction operation based on the input information and performing a corresponding operation on an operation object (including entity objects such as TV, lamp, washing machine, and non-entity objects displayed by eyewear projection, etc.); besides, the present disclosure may further provide a function of customizing an interaction operation for a user.

Figure 2:
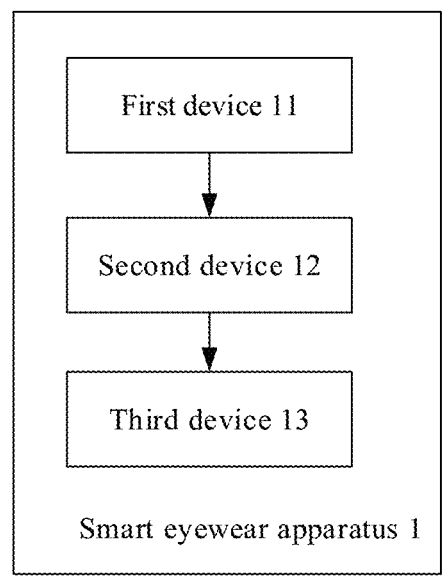
FIG. 2 shows an apparatus schematic diagram of a smart eyewear apparatus for interacting based on multimodal inputs provided according to one aspect of the present disclosure.

Based on the above mentioned, FIG. 2 shows an apparatus schematic diagram of a smart eyewear apparatus for interacting based on multimodal inputs provided according to one aspect of the present disclosure, wherein the smart eyewear apparatus 1 comprises: a first device 11, a second device 12, and a third device 13.

Particularly, the first device 11 acquires a plurality of input information from at least one of a plurality of input modules, the plurality of input modules including: an image input module, a voice input module, a touch input module, and a sensing input module, the plurality of input information including at least any one of: real scene information, virtual scene information, gesture information, voice information, touch information, and sensing information; the second device 12 performs comprehensive logic analysis of the plurality of input information to generate an operation command, wherein the operation command has operation elements, the operation elements at least including an operation object, an operation action, and an operation parameter; and the third device 13 performs a corresponding operation on the operation object based on the operation command.

Here, the smart eyewear apparatus 1 is a wearable smart device that implements a better user interaction experience with a linking between online information and offline information and a fusion between virtuality and reality, which is a software interaction manner with an eyewear as a hardware carrier fused with AR (Augmented Reality). The smart eyewear apparatus 1 may employ any operating system, e.g., an Android operating system, an iOS operating system, etc. The hardware device of the smart eyewear apparatus 1 may include: a camera input module (e.g., an RGB camera, a three-dimensional camera, etc.), a sensing input module (e.g., an inertial measurement unit IMU, including an electronic compass, an accelerometer, an angular velocity transducer, a gyroscope, etc.), a voice input module (e.g., a speaker, etc.), a display screen, a voice playing device, a haptic output device, and a data processing module, etc. Of course, the hardware devices included in the smart eyewear apparatus 1 as described above are only exemplary, and any possibly emerging smart eyewear apparatus 1 in future, if applicable to the present disclosure, may be still incorporated herein by reference.

Here, the real scene information may be an image, a picture, a scene image, a real object image, or an object with a specific shape, etc. The augmented reality effect may include an associated augmented reality content (including, but not limited to, video, audio, link, 2D animation, 3D animation, etc.) and a corresponding augmented reality display effect. The virtual scene information may be a virtual image displayed at the smart eyewear apparatus 1.

The smart eyewear apparatus 1 according to the present disclosure enables a user to interact in a way more approximate to a natural language to improve user interaction experience by: acquiring multi-channel input information with a plurality of input modules, performing comprehensive logical analysis on the input information to determine operation elements such as an operation object, an operation action, and an operation action, so as to generate an operation command, and then performing a corresponding operation based on the operation command, thereby performing in real time fusion processing to real scene information, virtual scene information, gesture information, voice information, touch information, and sensing information.

Figure 3:
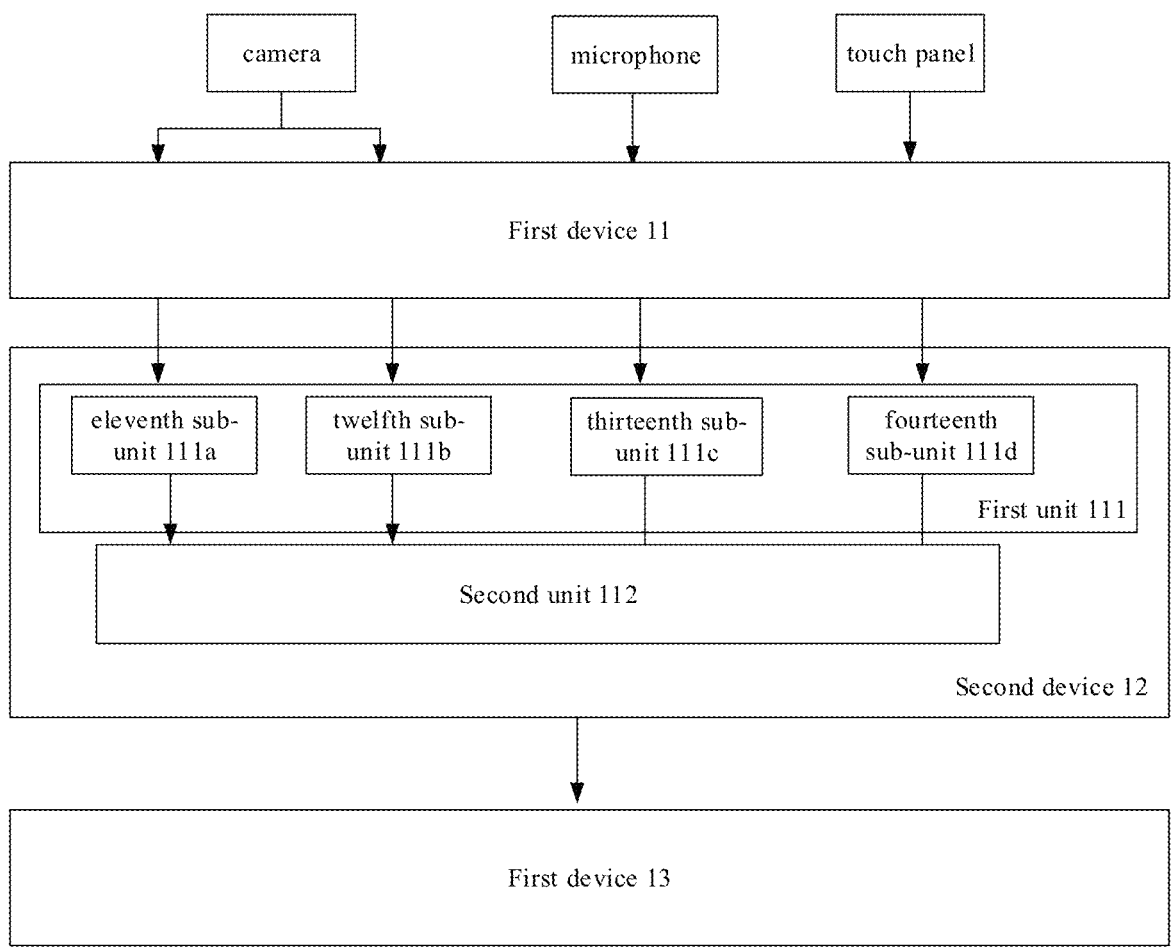
FIG. 3 shows an apparatus schematic diagram of a smart eyewear apparatus for interacting based on multimodal inputs provided according to a preferred embodiment of the present disclosure.

FIG. 3 shows an apparatus schematic diagram of a smart eyewear apparatus for interacting based on multimodal inputs provided according to a preferred embodiment of the present disclosure, wherein the first device 11 acquires a plurality of input information from at least one of a plurality of input modules. Here, the smart eyewear apparatus 1 receives input information of various natural language interaction manners of the user via different channels (i.e., various input modules) to analyze user behavior information and determine an operation object, an operation action, and an operation parameter, wherein the operation object may be a physical entity, or a virtual object displayed on a display screen of the smart eyewear apparatus 1.

In some embodiments, the natural language interaction manners used by the user may include: a scene including a background and an entity within a current view range, and a user interface or an object of an eyewear projection; a gesture including a position, orientation, and action of a hand; voice including a meaning represented by textual information; and touch including a force and an operation action of a finger.

Particularly, the multimodal inputs information of respective channels is mainly acquired by the following hardware: an RGB camera which acquires scene image information, a depth camera which acquires gesture information, a microphone which acquires voice information, and a touch panel which acquires touch information, etc.; of course, the input information acquired by the smart eyewear apparatus 1 and the hardware devices in use are not limited. Any possibly emerging acquiring manner or acquiring devices may be incorporated here by reference.

The second device 12 performs a comprehensive logic analysis of the plurality of input information to generate an operation command.

Further, the second device 12 of the smart eyewear apparatus 1 may perform the following processing to the input information acquired by respective channels: separately processing, by respective modules, the input information acquired by respective input modules to generate structured data; then, collectively submitting the structured data to a multi-channel interaction information analyzing and fusing module to process; alternatively, creating a deep learning module such that raw data of the input information acquired by respective input modules are subjected to fusion processing and logic analysis directly using the deep learning model.

In some embodiments, the second device 12 comprises: a first unit 111 and a second unit 112, wherein the first unit 111 performs recognition pre-processing, using corresponding processing modules, to the plurality of the input information of the input modules, respectively, to generate a plurality of the structured data, wherein the processing modules include a scene image recognition module, a gesture recognition module, a voice recognition module, a touch recognition module, and a sensing recognition module; and the second unit 112 performs fusion processing and arbitration analysis of the plurality of structured data so as to generate an operation command.

Further, the first unit 111 may process the input information of each channel using the corresponding recognition module, including extracting features and/or analyzing meanings to output structured data, where the structures of the structured data corresponding to the input information of respective channels may be identical or different, as long as they may be subjected to fusion processing and arbitration analysis by the second unit 112.

Particularly, different processing modules utilized by the first unit 111 may correspond to a eleventh sub-unit 111a configured for recognizing a scene image, a twelfth sub-unit 111b configured for recognizing gesture information, a thirteenth sub-unit 111c configured for acquiring touch information, and a fourteenth sub-unit 111d configured for acquiring language information.

Among them, the eleventh sub-unit 111a recognizes, using the scene image recognition module, the virtual scene information and/or the real scene information inputted by the image input module to obtain structured data about a set of operable objects; the twelfth sub-unit 111b recognizes, using the gesture recognition module, the gesture information inputted by the image input module to obtain structured data of a set of operable objects and/or structured data of a set of operable actions; the thirteenth sub-unit 111c recognizes, using the touch recognition module, the touch information inputted by the touch input module to obtain at least any one of the following structured data: structured data of a position of a cursor on a screen, structured data of a set of operable actions, and structured data of input parameters; and the fourteenth sub-unit 111d recognizes, using the voice recognition module, the voice information inputted by the voice input module to obtain at least any one of the following structured data: structured data of a set of operable objects, structured data of a set of operable actions, and structured data of input parameters.

By adopting different processing modules to perform recognition pre-processing based on different input information and generating pre-processed structured data, the parallel processing may facilitate the data processing speed; because the processing process of the second unit 112 is not based on the raw data of the input information, it is more flexible to include what processing modules in the first unit 111.

Fusion and arbitration rules or a training model executed by the second unit 112 may be pre-defined or pre-trained (including, defining, by a developer, an initial set of rules or an initial training model, or a model updated by the user based on a rule or model); the rule may be a relationship between natural interaction manners (e.g., a cooperation or contention relationship between a gesture and a voice, etc.), or a machine learning model (e.g., a decision tree, a random forest, etc.).

Specifically, the second unit 112 may perform fusion with a method such as slot filling, i.e., the slot is an operation multi-tuple corresponding to an operation command, e.g., an operation three-tuple <operation object, operation action, operation parameter (optional)>, each slot in the operation three-tuple represents an operation type of an operation element; the structured data are filled in the slots according to a time orders or priority contention; when the slots are fully filled and in compliance with the executing business logic, a corresponding operation command is generated and executed. Particularly, the time orders and the priority contention logic may be defined by the developer or updated by the user.

When the second unit 112 performs fusion processing using the slot filling method, firstly, in an initial wait state, when the first unit 111 inputs the structured data to the second unit 112, logic matching is performed to the corresponding structured data, including extracting key information and matching between the key information so as to determine the element type corresponding to the structured data and the corresponding element information; when at least one piece of element information is detected, the second unit is switched into a ready state, and different element information is filled in the slots of respective operation elements based on element types, and other element types and corresponding element information are continuously acquired; in the ready state, it is constantly detected whether the slots for respective operation elements are fully filled; if so, whether to comply with the executing business logic is determined; in the case of yes, a corresponding operation command is generated, and the slots are cleared; the above process runs in constantly cycle during the interaction process.

Specifically, the second unit 112 comprises: a twenty-first sub-unit (not shown), a twenty-second sub-unit (not shown), and a twenty-third sub-unit (not shown); wherein the twenty-first sub-unit determines element types corresponding to the structured data; the twenty-second sub-unit performs logic matching and/or arbitration selection to the structured data of a same element type to determine element information of the operation element corresponding to the element type; the twenty-third sub-unit generates an operation command based on the element information of the corresponding operation element if a combination of element information of the operation elements corresponding to the determined different element types complies with the executing business logic.

Further, the twenty-second sub-unit comprises: a twenty-fourth sub-unit, a twenty-fifth sub-unit, and a twenty-sixth sub-unit, wherein the twenty-fourth sub-unit performs logic matching to the structured data of the same element type to determine at least one to-be-selected element information; the twenty-fifth sub-unit performs arbitration selection to the to-be-selected element information to select one of them as selected element information; and the twenty-sixth sub-unit determines the element information of the operation element corresponding to the element type based on the selected element information.

The twenty-second sub-unit further comprises: a twenty-seventh sub-unit configured for re-performing arbitration selection to the remaining to-be-selected element information so as to reselect one of them as selected element information when a combination of the element information of the determined operation elements corresponding to the different element types does not comply with executing business logic; and a twenty-eighth sub-unit is configured for clearing the element information of the operation elements corresponding to all operation types when the duration of reselection exceeds an overtime or all of the combination of the element information determined for the to-be-selected element information does not comply with executing business logic. The twenty-seventh sub-unit and the twenty-eighth sub-unit are configured for reselecting element information for determination when the combination of element information does not comply with the executing business logic.

The twenty-fifth sub-unit is configured for performing contention selection based on time orders and/or priority rankings of the to-be-selected information; when the time orders and priority rankings of the to-be-selected element information are both identical, performing random selection to select one of them as the selected element information.

The twenty-fifth sub-unit performs arbitration selection to the to-be-selected element information, wherein the contention may be made by time order. For example, if the gesture information is firstly acquired, the structured data analyzed and acquired by the gesture recognition module are filled in priority in the slot of the operation object; in the case of concurrent input or if the input time difference is smaller than a set threshold, contention is made according to a defined priority, e.g., if voice input information has a higher priority than the gesture input information, the structured data generated based on the voice information extracted by the voice recognition module are filled in priority in the corresponding slot; besides, if the input time and the priority are both identical, certain structured data will be selected randomly to be filled in the corresponding slot, while the unselected structured data enter a buffer queue to wait for being re-invoked or are directly discarded.

During the process in which the twenty-sixth sub-unit determines the selected element information as the corresponding element information, it needs to be determined whether element information has already been existent in the corresponding operation element; if yes, priorities of the currently existing element information and the selected element information need to be determined; if the selected element information has a higher priority, the existing element information needs to be replaced; specifically, the twenty-sixth sub-unit determines whether there currently exists element information of the operation element corresponding to the element type; in the case of existence, it is determined whether the priority of the selected element information is higher than the existing element information; if yes, the selected element information replaces the existing element information and is determined as the element information of the operation element corresponding to the element type. For example, if the priority of the voice information is relatively high, and the operation object is determined as TV based on image recognition (but before determining the output operation command) while the operation object is recognized as a mobile phone based on voice information, then the twenty-sixth sub-unit changes the element information of the operation object from "TV" to "mobile phone" based on a principle that the voice information has a higher priority.

Figure 4:
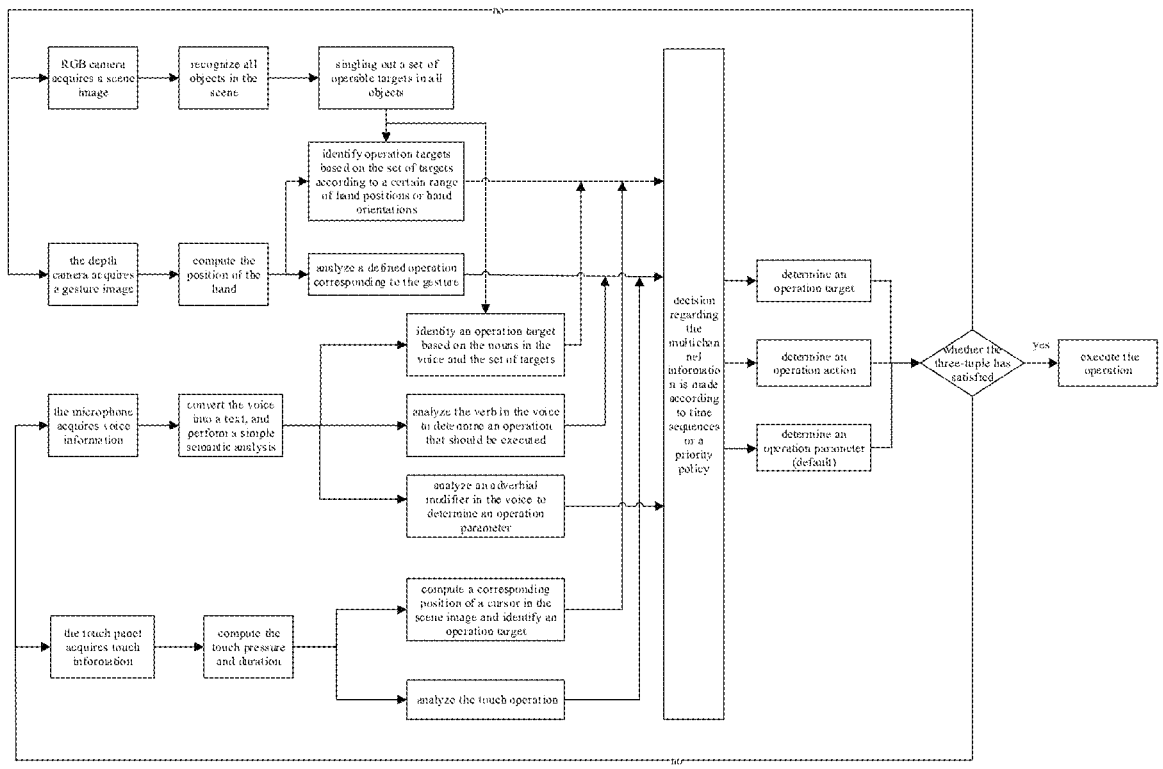
FIG. 4 shows a flow schematic diagram of a smart eyewear apparatus interacting based on multimodal inputs according to a preferred embodiment of the present disclosure.

FIG. 4 shows the flow schematic diagram of the smart eyewear apparatus interacting based on multimodal inputs according to a preferred embodiment of the present disclosure, wherein the smart eyewear apparatus may acquire a scene image by its RGB camera, acquire a gesture image by a depth camera, acquire voice information by a microphone, and acquire touch information by a touch panel, and then recognizes, from a scene image, all operable objects (e.g., a TV, a curtain, a lamp and the like in a living room) in the scene image of the current view angle, where an object library is formed by names of the objects as a set of operable objects; convert the voice uttered by the user into text to perform a simple semantic analysis and extract verbs, nouns, and pronouns, etc., where the verbs may represent operation actions, and the nouns and pronouns may be directed to operation objects; track, in real time, a position of a hand to determine a pointing direction of the hand and analyze an operation corresponding to a gesture; and uses the touch panel to recognize a sensing touch operation to thereby acquire a position of a cursor pointed by the touch and the corresponding operation, e.g., when analyzing a user swiping operation, calculating the position of cursor move, and determining a single-click or double-click operation by analyzing the pressure of user touch. Next, when the smart eyewear apparatus is in a waiting state, the smart eyewear apparatus will simultaneously wait multiple channel input information such as user voice, gesture, and touch; when there is only one channel input, e.g., voice information input, the smart eyewear apparatus directly makes a decision according to voice contents; when these channels have information input simultaneously, the smart eyewear apparatus concurrently analyzes the information of the respective channels, and then makes a decision based on time orders or priorities. For example, if the voice information is first input and has the highest priority, then the voice content will be first analyzed. If the voice content does not cause ambiguity in understanding of an operation, the operation is directly performed based on the voice content. If the voice content still needs supplementation from other channel information to form a complete operation three-tuple, it is needed to combine with other channel information, so as to perform a comprehensive determination based on a working manner in an information complementary mode. For example, when the user says "please tell me about the content at this side," the smart eyewear apparatus will make a determination based on the direction pointed by the gesture and provides information feedback; when there is no voice information input but the smart eyewear apparatus detects a touch move or gesture change, it will determine the user's operation based on the information of such channels. For example, when the user makes an "OK" gesture, it indicates a consent; while "waving hand" indicates disagreement; sliding of user touch indicates moving the cursor; while single-clicking or double-clicking touch of the user indicates selection or open. In this case, the smart eyewear apparatus performs operation analysis based on the information inputted by the current channel. Corresponding devices acquire data of corresponding channels, respectively; and then the information of respective channels is converted into structured data using a trained model; finally, the structured data of respective channels are summarized to make the determination based on the trained operation model, an operation three-tuple is outputted, and then the corresponding operation is executed based on the three-tuple.

Besides, the second unit 112 may perform logic matching and arbitration selection to all of the structured data using a machine learning method so as to determine element information of the operation element corresponding to each of the element types, wherein the machine learning method includes at least one of: a decision tree method, a random forest method, and a convolutional neural network method.

In another preferred embodiment, the second device comprises a third unit (not shown) and a fourth unit (not shown), wherein the third unit creates a deep learning neural network architecture model; and the fourth unit inputs raw data of the input information into the deep learning neural network architecture model so as to be subjected to fusion processing and model operation, thereby generating an operation command.

Particularly, the deep learning neural network architecture model is a convolutional neural network architecture model.

Figure 8:
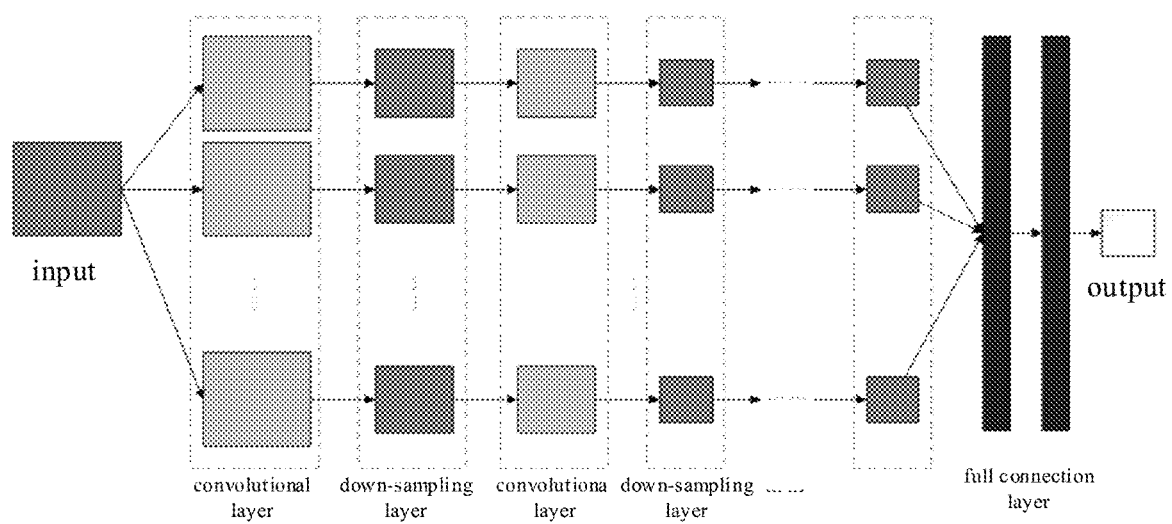
FIG. 8 shows a schematic diagram of performing comprehensive logic analysis using a deep learning network method at a smart eyewear apparatus end provided according to a preferred embodiment of the present disclosure.

FIG. 8 shows a schematic diagram of performing comprehensive logic analysis using a deep learning network method at the smart eyewear apparatus end provided according to a preferred embodiment of the present disclosure. Here, the convolutional neural network (CNN) is a kind of artificial neural network and configured for voice analysis and image recognition. More like a biological neural network, it reduces the complexity of network model and the number of weights. It behaves even superior when the network input is multi-dimensional data, where the raw data may be directly used as network input, which avoids the complex process of feature extraction and data reconstruction as in a traditional recognition algorithm.

Particularly, the basic structure of the CNN includes two layers. One layer is a feature extraction layer, where input of each neuron is connected to a local acceptance domain of the preceding layer and the local feature is extracted; after the local feature is extracted, its positional relationships with other features are also determined. The second layer is a feature mapping layer, where each computation layer of the network is formed by a plurality of feature mappings, each feature mapping being a plane, and the weights of all neurons are equal on the plane. The feature mapping structure may adopt a sigmoid function (S-shaped growth curve function) whose kernel function has small influence as an activation function of the convolutional network, such that the feature mapping has a property of displacement invariant.

Besides, because the neurons on one mapping plane share a weight, the number of network free parameters is reduced. Each convolutional layer in the convolutional neural network is immediately followed by a computation layer for solving local average and secondary extraction; such a peculiar structure of twice feature extractions reduces the feature resolution. The CNN is mainly for recognizing a two-dimensional image with invariants of displacement, scaling and other forms of distortion. Because the feature detection layer of the CNN performs learning through training data, explicit feature extraction is avoided when using the CNN; instead, learning from the training data is performed implicitly; moreover, because the weights of the neurons on the same feature mapping plane are identical, the network may learn concurrently, which is also a major advantage of the convolutional network over a network with mutually connected neurons.

With its special structure of sharing local weights, the convolutional neural network has a unique advantage in aspects of voice recognition and image processing, and its layout is more approximate to an actual biological neural network; the sharing of weight reduces the network complexity; in particular, the characteristic that the image of the multi-dimensional input vectors may be directly inputted in the network avoids the complexity in data reconstruction during the feature extraction and classification process.

In a preferred embodiment of the present disclosure, fusion of multimodal interaction data is implemented by the convolutional neural network in deep learning. Specific implementation steps include:

obtaining raw data of input signals acquired periodically (i.e., according to a certain time interval) by respective input models, and converting the raw data into data in a matrix form; and inputting the data in a matrix form into a convolutional neural network structure model that has completed parameter training to generate a corresponding operation command.

In a preferred embodiment, due to a small training data set and more dimensions of training data, fusion of the multimodal interaction data may be completed using the following network structure. The convolutional neural network structure model includes 6 convolutional layers. Each convolutional layer is followed by an activated function (i.e., rectified linear units ReLU); the second, fourth, and sixth convolutional layers are all followed by a down-sampling layer, respectively, wherein the down-sampling uses a mean down-sampling; two full connection layers are used at the end of the convolutional neural network structure model to pull the data into a vector for classifying; vectors are outputted after the full connection layers, including scores of all classes, where the class with the highest score is the determined operation command (e.g., including an operation three-tuple).

Further, the smart eyewear apparatus 1 further comprises: the split-mount control device (not shown), configured for acquiring a plurality of the input information, and performing comprehensive logic analysis so as to generate the operation command, wherein the split-mount control device is physically separated from a body of the smart eyewear apparatus 1 and is in communication connection with the smart eyewear apparatus 1 in a wired or wireless manner.

Here, the content of performing comprehensive logical analysis of the input information by the separate control device may be identical or substantially identical to the content of the second device 12 in FIG. 3. For the sake of brevity, it will not be detailed here, but incorporated here by reference.

By providing a physically detached split-mount control device that is in communication connection with the smart eyewear apparatus 1 in a wired or wireless manner, such that the processing core business logic of the smart eyewear apparatus 1 is run by the split-mount control device, the smart eyewear apparatus 1 may become smaller in size and lighter in weight; besides, use discomfort for users caused by over heat radiation of the smart eyewear apparatus 1 may be avoided.

The smart eyewear apparatus 1 further comprises: a fourth device (not shown), wherein the fourth device is configured for acquiring the user's determination information on the operation command and updating a corresponding training model for comprehensive logic analysis based on the operation command and the corresponding determination information. The smart eyewear apparatus 1 provides a function of defining an interaction operation, i.e., performing feature extraction and/or semantic analysis of the acquired input information based on an operation element corresponding to the operation command specified by the user, and finally outputting structured data (the structures of the structured data may be identical or different), establishes the structured data, establishes an association relationship between the structured data obtained from the analysis and the operation command specified by the user, and updates an existing set of rules or an existing machine learning model.

Figure 5:
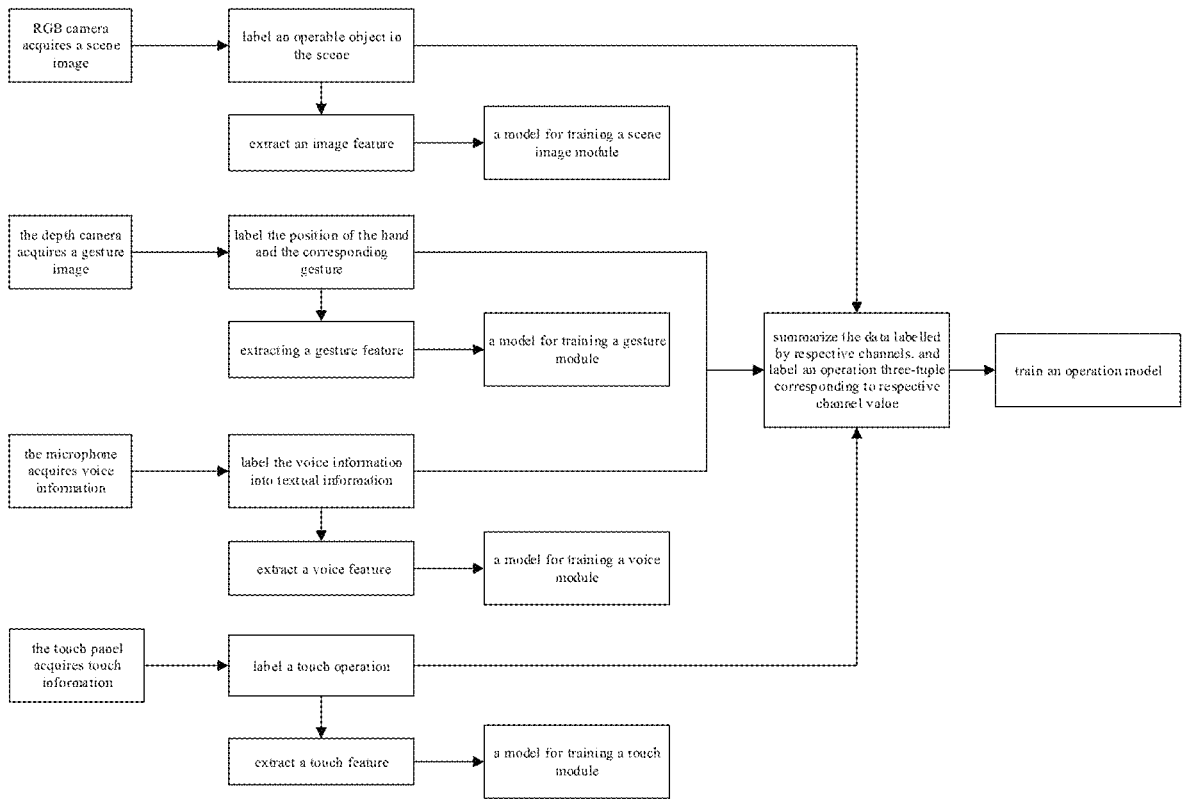
FIG. 5 shows a process schematic diagram of the smart eyewear apparatus defining an interaction operation based on a user operation provided according to a preferred embodiment of the present disclosure.

FIG. 5 shows a process schematic diagram of the smart eyewear apparatus defining an interaction operation based on a user operation provided according to a preferred embodiment of the present disclosure.

Specifically, the smart eyewear apparatus 1 enters a state of defining an interaction operation based on user selection;

determines, based on the user selection, input information of a corresponding input module associated with a to-be-defined operation command, specifically comprising: initiating a plurality of input modules, acquiring input information of a user-defined operation for each operation element. For example, prompting the user a to-be-selected stage for an operation object, the user utters a voice "TV" to the microphone, or his gesture points to a "TV" entity in a real scene within a current view range, or selects, using a touch device, a "TV" entity in the real scene in a selected view range, etc.; for another example, in the to-be-selected stage of the user for an operation action, a voice input "turn on," a gesture input with a "turn on" implication, and a touch input with a "turn on" implication, etc., are input.

next, extracts the input information of the user-defined operation for each operation element respectively using various channel technologies (e.g., image recognition, gesture identification, touch recognition, and voice recognition, etc.) to perform feature extraction and semantic analysis, and converts the input information into structured data;

finally, establishes a corresponding association for the structured data corresponding to the operation elements in respective operation types, generates a corresponding operation command, and updates the business logic corresponding to the respective operation command to an existing rule or model.

The user may autonomously define an interaction operation by acquiring relevant information of an operation command to be set by the user and updating the operation command based on the relevant information of the to-be-set operation command, which improves use flexibility for the user.

Figure 6:
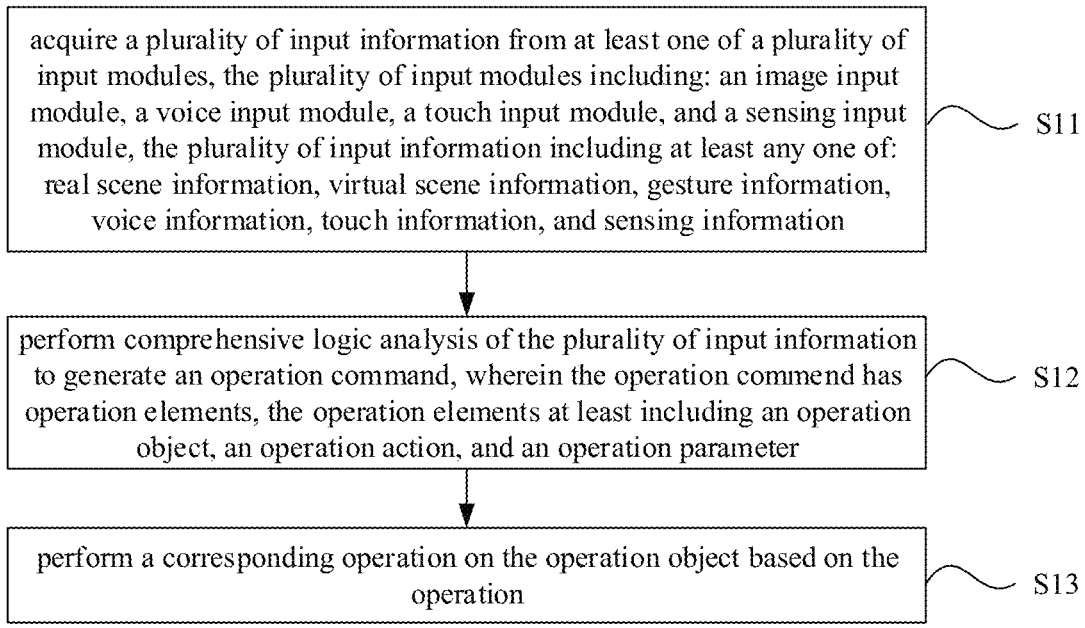
FIG. 6 shows a flow schematic diagram of interacting based on multimodal inputs at a smart eyewear apparatus end provided according to one aspect of the present disclosure.

FIG. 6 shows a flow schematic diagram of interacting based on multimodal inputs at a smart eyewear apparatus end provided according to one aspect of the present disclosure; wherein the method comprises step S11, step S12 and step S13.

Particularly, in the step S11, the smart eyewear apparatus acquires a plurality of input information from at least one of a plurality of input modules, the plurality of input modules including: an image input module, a voice input module, a touch input module, and a sensing input module, the plurality of input information including at least any one of: real scene information, virtual scene information, gesture information, voice information, touch information, and sensing information; in the step S12, the smart eyewear apparatus performs comprehensive logic analysis of the plurality of input information to generate an operation command, wherein the operation command has operation elements, the operation elements at least including an operation object, an operation action, and an operation parameter; and in the step S13, the smart eyewear apparatus performs a corresponding operation on the operation object based on the operation command.

Here, the smart eyewear apparatus 1 is a wearable smart device that implements a better user interaction experience with a linking between online information and offline information and a fusion between virtuality and reality, which is a software interaction manner with an eyewear as a hardware carrier fused with AR (Augmented Reality). The smart eyewear apparatus 1 may employ any operating system, e.g., an Android operating system, an iOS operating system, etc. The hardware device of the smart eyewear apparatus 1 may include: a camera input module (e.g., an RGB camera, a three-dimensional camera, etc.), a sensing input module (e.g., an inertial measurement unit IMU, including an electronic compass, an accelerometer, an angular velocity transducer, a gyroscope, etc.), a voice input module (e.g., a speaker, etc.), a display screen, a voice playing device, a haptic output device, and a data processing module, etc. Of course, the hardware devices included in the smart eyewear apparatus 1 as described above are only exemplary, and any possibly emerging smart eyewear apparatus 1 in future, if applicable to the present disclosure, may be still incorporated herein by reference.

Here, the real scene information may be an image, a picture, a scene image, a real object image, or an object with a specific shape, etc. The augmented reality effect may include an associated augmented reality content (including, but not limited to, video, audio, link, 2D animation, 3D animation, etc.) and a corresponding augmented reality display effect. The virtual scene information may be a virtual image displayed at the smart eyewear apparatus 1.

The smart eyewear apparatus 1 according to the present disclosure enables a user to interact in a way more approximate to a natural language to improve user interaction experience by: acquiring multi-channel input information with a plurality of input modules, performing comprehensive logical analysis on the input information to determine operation elements such as an operation object, an operation action, and operation parameters so as to generate an operation command, and then performing a corresponding operation based on the operation command, thereby performing in real time fusion processing to real scene information, virtual scene information, gesture information, voice information, touch information, and sensing information.

Figure 7:
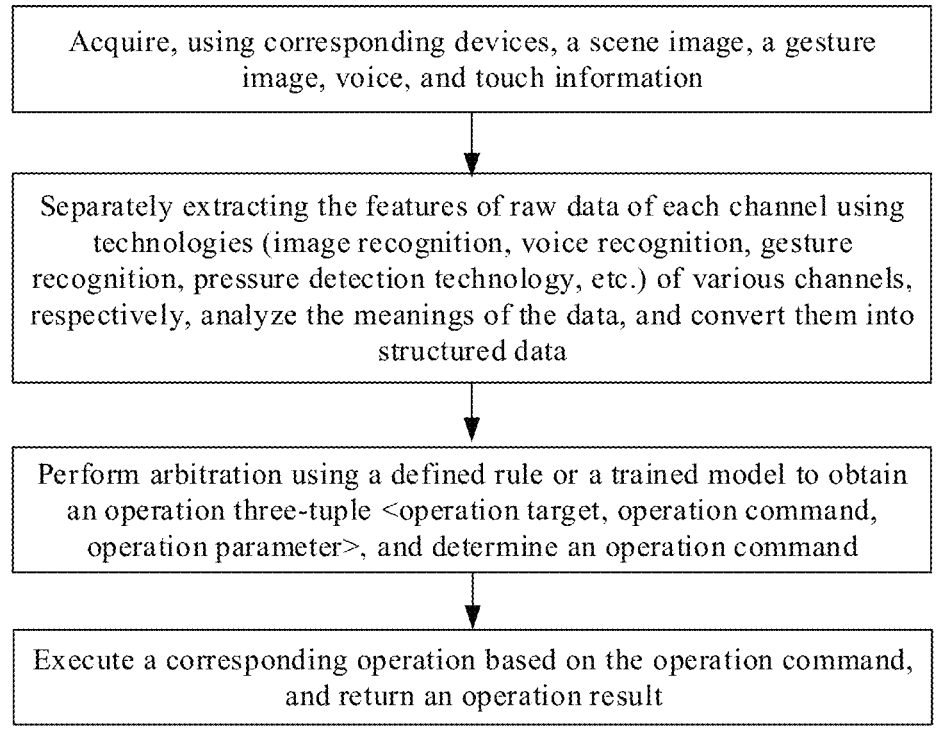
FIG. 7 shows a flow schematic diagram of a method for interacting based on multimodal inputs at a smart eyewear apparatus end provided according to a preferred embodiment of the present disclosure.

FIG. 7 shows a flow schematic diagram of a method for interacting based on multimodal inputs at a smart eyewear apparatus end provided according to a preferred embodiment of the present disclosure; wherein the step S11, the smart eyewear apparatus 1 acquires a plurality of input information from at least one of a plurality of input modules. Here, the smart eyewear apparatus 1 receives input information of various natural language interaction manners of the user via different channels (i.e., various input modules) to analyze user behavior information and determine an operation object, an operation action, and an operation parameter, wherein the operation object may be a physical entity, or a virtual object displayed on a display screen of the smart eyewear apparatus 1.

In some embodiments, the natural language interaction manners used by the user may include: a scene including a background and an entity within a current view range, and a user interface or an object of an eyewear projection; a gesture including a position, orientation, and action of a hand; voice including a meaning represented by textual information; and touch including a force and an operation action of a finger.

Particularly, the multimodal inputs information of respective channels is mainly acquired by the following hardware: an RGB camera which acquires scene image information, a depth camera which acquires gesture information, a microphone which acquires voice information, and a touch panel which acquires touch information, etc.; of course, the input information acquired by the smart eyewear apparatus 1 and the hardware devices in use are not limited. Any possibly emerging acquiring manner or acquiring devices may be incorporated here by reference.

In the step S12, the smart eyewear apparatus 1 performs a comprehensive logic analysis of the plurality of input information to generate an operation command.

Further, in the step S12, the smart eyewear apparatus 1 may perform the following processing to the input information acquired by respective channels: separately processing, by respective modules, the input information acquired by respective input modules to generate structured data; then, collectively submitting the structured data to a multi-channel interaction information analyzing and fusing module to process; alternatively, creating a deep learning module such that raw data of the input information acquired by respective input modules are subjected to fusion processing and logic analysis directly using the deep learning model.

In a preferred embodiment, the step S12 comprises: a step S111, performing recognition pre-processing, using corresponding processing modules, to the plurality of the input information of the input modules, respectively, to generate a plurality of the structured data, wherein the processing modules include a scene image recognition module, a gesture recognition module, a voice recognition module, a touch recognition module, and a sensing recognition module; and a step S112, performing fusion processing and arbitration analysis of the plurality of structured data so as to generate an operation command.

Further, in the step S111, the smart eyewear apparatus 1 may process the input information of each channel using the corresponding recognition module, including extracting features and/or analyzing meanings to output structured data, where the structures of the structured data corresponding to the input information of respective channels may be identical or different, as long as they may be subjected to fusion processing and arbitration analysis.

Particularly, different processing modules utilized by the smart eyewear apparatus 1 process input information, wherein the step S111*a* recognizes, using the scene image recognition module, the virtual scene information and/or the real scene information inputted by the image input module to obtain structured data about a set of operable objects; the step S111*b* recognizes, using the gesture recognition module, the gesture information inputted by the image input module to obtain structured data of a set of operable objects and/or structured data of a set of operable actions; the step S111*c* recognizes, using the touch recognition module, the touch information inputted by the touch input module to obtain at least any one of the following structured data: structured data of a position of a cursor on a screen, structured data of a set of operable actions, and structured data of input parameters; and the step S111*d* recognizes, using the voice recognition module, the voice information inputted by the voice input module to obtain at least any one of the following structured data: structured data of a set of operable objects, structured data of a set of operable actions, and structured data of input parameters.

By adopting different processing modules to perform recognition pre-processing based on different input information and generating pre-processed structured data, the parallel processing may facilitate the data processing speed; because the processing process of the step S112 is not based on the raw data of the input information, it is more flexible to include what processing modules in the step S111.

Fusion and arbitration rules or a training model executed in the step S112 may be pre-defined or pre-trained (including, defining, by a developer, an initial set of rules or an initial training model, or a model updated by the user based on a rule or model); the rule may be a relationship between natural interaction manners (e.g., a cooperation or contention relationship between a gesture and a voice, etc.), or a machine learning model (e.g., a decision tree, a random forest, etc.).

Specifically, the step S112 may perform fusion with a method such as slot filling, i.e., the slot is an operation multi-tuple corresponding to an operation command, e.g., an operation three-tuple <operation object, operation action, operation parameter (optional)>, each slot in the operation three-tuple represents an operation type of an operation element; the structured data are filled in the slots according to a time orders or priority contention; when the slots are fully filled and in compliance with the executing business logic, a corresponding operation command is generated and executed. Particularly, the time orders and the priority contention logic may be defined by the developer or updated by the user.

When the step S112 performs fusion processing using the slot filling method, firstly, in an initial wait state, when the first unit 111 inputs the structured data to the second unit 112, logic matching is performed to the corresponding structured data, including extracting key information and matching between the key information so as to determine the element type corresponding to the structured data and the corresponding element information; when at least one piece of element information is detected, a ready state is switched into, and different element information is filled in the slots of respective operation elements based on element types, and other element types and corresponding element information are continuously acquired; in the ready state, it is constantly detected whether the slots for respective operation elements are fully filled; if so, whether to comply with the executing business logic is determined; in the case of yes, a corresponding operation command is generated, and the slots are cleared; the above process runs in constantly cycle during the interaction process.

Specifically, the step S112 comprises: determining element types corresponding to the structured data; performing logic matching and/or arbitration selection to the structured data of a same element type to determine element information of the operation element corresponding to the element type; generating an operation command based on the element information of the corresponding operation element if a combination of element information of the operation elements corresponding to the determined different element types complies with the executing business logic.

Further, performing logic matching and/or arbitration selection to the structured data of a same element type to determine element information of the operation element corresponding to the element type comprises: performing logic matching to the structured data of the same element type to determine at least one to-be-selected element information; performing arbitration selection to the to-be-selected element information to select one of them as selected element information; and determining the element information of the operation element corresponding to the element type based on the selected element information.

Performing arbitration selection to the to-be-selected element information to select one of them as selected element information comprises: the smart eyewear apparatus 1 performing contention selection based on time orders and/or priority rankings of the to-be-selected information; when the time orders and priority rankings of the to-be-selected element information are both identical, performing random selection to select one of them as the selected element information.

The smart eyewear apparatus 1 performs arbitration selection to the to-be-selected element information, wherein the contention may be made by time order. For example, if the gesture information is firstly acquired, the structured data analyzed and acquired by the gesture recognition module are filled in priority in the slot of the operation object; in the case of concurrent input or if the input time difference is smaller than a set threshold, contention is made according to a defined priority, e.g., if voice input information has a higher priority than the gesture input information, the structured data generated based on the voice information extracted by the voice recognition module are filled in priority in the corresponding slot; besides, if the input time and the priority are both identical, certain structured data will be selected randomly to be filled in the corresponding slot, while the unselected structured data enter a buffer queue to wait for being re-invoked or are directly discarded.

During the process in which the smart eyewear apparatus 1 determines the selected element information as the corresponding element information, it needs to be determined whether element information has already been existent in the corresponding operation element; if yes, priorities of the currently existing element information and the selected element information need to be determined; if the selected element information has a higher priority, the existing element information needs to be replaced; specifically, the smart eyewear apparatus 1 determines whether there currently exists element information of the operation element corresponding to the element type; in the case of existence, it is determined whether the priority of the selected element information is higher than the existing element information; if yes, the selected element information replaces the existing element information and is determined as the element information of the operation element corresponding to the element type. For example, if the priority of the voice information is relatively high, and the operation object is determined as TV based on image recognition (but before determining the output operation command) while the operation object is recognized as a mobile phone based on voice information, then the element information of the operation object is changed from "TV" to "mobile phone" based on a principle that the voice information has a higher priority.

The smart eyewear apparatus 1 re-performs arbitration selection to the remaining to-be-selected element information so as to reselect one of them as selected element information when a combination of the element information of the determined operation elements corresponding to the different element types does not comply with executing business logic; and clears the element information of the operation elements corresponding to all operation types when the duration of reselection exceeds an overtime or all of the combination of the element information determined for the to-be-selected element information does not comply with executing business logic so as to reselect element information for determination when the combination of element information does not comply with the executing business logic.

With reference to FIG. 4, the smart eyewear apparatus may acquire a scene image by its RGB camera, acquire a gesture image by a depth camera, acquire voice information by a microphone, and acquire touch information by a touch panel, and then recognizes, from a scene image, all operable objects (e.g., a TV, a curtain, a lamp and the like in a living room) in the scene image of the current view angle, where an object library is formed by names of the objects as a set of operable objects; convert the voice uttered by the user into text to perform a simple semantic analysis and extract verbs, nouns, and pronouns, etc., where the verbs may represent operation actions, and the nouns and pronouns may be directed to operation objects; track, in real time, a position of a hand to determine a pointing direction of the hand and analyze an operation corresponding to a gesture; and uses the touch panel to recognize a sensing touch operation to thereby acquire a position of a cursor pointed by the touch and the corresponding operation, e.g., when analyzing a user swiping operation, calculating the position of cursor move, and determining a single-click or double-click operation by analyzing the pressure of user touch. Next, when the smart eyewear apparatus is in a waiting state, the smart eyewear apparatus will simultaneously wait multiple channel input information such as user voice, gesture, and touch; when there is only one channel input, e.g., voice information input, the smart eyewear apparatus directly makes a decision according to voice contents; when these channels have information input simultaneously, the smart eyewear apparatus concurrently analyzes the information of the respective channels, and then makes a decision based on time orders or priorities. For example, if the voice information is first input and has the highest priority, then the voice content will be first analyzed. If the voice content does not cause ambiguity in understanding of an operation, the operation is directly performed based on the voice content. If the voice content still needs supplementation from other channel information to form a complete operation three-tuple, it is needed to combine with other channel information, so as to perform a comprehensive determination based on a working manner in an information complementary mode. For example, when the user says "please tell me about the content at this side," the smart eyewear apparatus will make a determination based on the direction pointed by the gesture and provides information feedback; when there is no voice information input but the smart eyewear apparatus detects a touch move or gesture change, it will determine the user's operation based on the information of such channels. For example, when the user makes an "OK" gesture, it indicates a consent; while "waving hand" indicates disagreement; sliding of user touch indicates moving the cursor; while single-clicking or double-clicking touch of the user indicates selection or open. In this case, the smart eyewear apparatus performs operation analysis based on the information inputted by the current channel. Corresponding devices acquire data of corresponding channels, respectively; and then the information of respective channels is converted into structured data using a trained model; finally, the structured data of respective channels are summarized to make the determination based on the trained operation model, an operation three-tuple is outputted, and then the corresponding operation is executed based on the three-tuple.

Besides, in the step S112, the smart eyewear apparatus 1 may perform logic matching and arbitration selection to all of the structured data using a machine learning method so as to determine element information of the operation element corresponding to each of the element types, wherein the machine learning method includes at least one of: a decision tree method, a random forest method, and a convolutional neural network method.

In another preferred embodiment, the step S12 comprises: creating a deep learning neural network architecture model; and inputting raw data of the input information into the deep learning neural network architecture model so as to be subjected to fusion processing and model operation, thereby generating an operation command.

Particularly, the deep learning neural network architecture model is a convolutional neural network architecture model.

Here, the convolutional neural network (CNN) is a kind of artificial neural network and configured for voice analysis and image recognition. More like a biological neural network, it reduces the complexity of network model and the number of weights. It behaves even superior when the network input is multi-dimensional data, where the raw data may be directly used as network input, which avoids the complex process of feature extraction and data reconstruction as in a traditional recognition algorithm.

Particularly, the basic structure of the CNN includes two layers. One layer is a feature extraction layer, where input of each neuron is connected to a local acceptance domain of the preceding layer and the local feature is extracted; after the local feature is extracted, its positional relationships with other features are also determined. The second layer is a feature mapping layer, where each computation layer of the network is formed by a plurality of feature mappings, each feature mapping being a plane, and the weights of all neurons are equal on the plane. The feature mapping structure may adopt a sigmoid function (S-shaped growth curve function) whose kernel function has small influence as an activation function of the convolutional network, such that the feature mapping has a property of displacement invariant.

Besides, because the neurons on one mapping plane share a weight, the number of network free parameters is reduced. Each convolutional layer in the convolutional neural network is immediately followed by a computation layer for solving local average and secondary extraction; such a peculiar structure of twice feature extractions reduces the feature resolution. The CNN is mainly for recognizing a two-dimensional image with invariants of displacement, scaling and other forms of distortion. Because the feature detection layer of the CNN performs learning through training data, explicit feature extraction is avoided when using the CNN; instead, learning from the training data is performed implicitly; moreover, because the weights of the neurons on the same feature mapping plane are identical, the network may learn concurrently, which is also a major advantage of the convolutional network over a network with mutually connected neurons.

With its special structure of sharing local weights, the convolutional neural network has a unique advantage in aspects of voice recognition and image processing, and its layout is more approximate to an actual biological neural network; the sharing of weight reduces the network complexity; in particular, the characteristic that the image of the multi-dimensional input vectors may be directly inputted in the network avoids the complexity in data reconstruction during the feature extraction and classification process.

In a preferred embodiment of the present disclosure, fusion of multimodal interaction data is implemented by the convolutional neural network in deep learning. Specific implementation steps include:

obtaining raw data of input signals acquired periodically (i.e., according to a certain time interval) by respective input models, and converting the raw data into data in a matrix form; and inputting the data in a matrix form into a convolutional neural network structure model that has completed parameter training to generate a corresponding operation command.

In a preferred embodiment, due to a small training data set and more dimensions of training data, fusion of the multimodal interaction data may be completed using the following network structure. The convolutional neural network structure model includes 6 convolutional layers. Each convolutional layer is followed by an activated function (i.e., rectified linear units ReLU); the second, fourth, and sixth convolutional layers are all followed by a down-sampling layer, respectively, wherein the down-sampling uses a mean down-sampling; two full connection layers are used at the end of the convolutional neural network structure model to pull the data into a vector for classifying; vectors are outputted after the full connection layers, including scores of all classes, where the class with the highest score is the determined operation command (e.g., including an operation three-tuple).

Further, the smart eyewear apparatus 1 further comprises: the split-mount control device (not shown), configured for helping acquiring a plurality of the input information, and performing comprehensive logic analysis so as to generate the operation command, wherein the split-mount control device is physically separated from a body of the smart eyewear apparatus 1 and is in communication connection with the smart eyewear apparatus 1 in a wired or wireless manner. The split-mount control device may process the core business logic of the smart eyewear apparatus 1 and store data, which may reduce the weight of the smart eyewear apparatus 1 to a great margin and ameliorate other problems such as heat radiation of the smart eyewear apparatus 1.

Here, the content of performing comprehensive logical analysis of the input information by the separate control device may be identical or substantially identical to the content of the second device 12 in FIG. 3. For the sake of brevity, it will not be detailed here, but incorporated here by reference.

By providing a physically detached split-mount control device that is in communication connection with the smart eyewear apparatus 1 in a wired or wireless manner, such that the processing core business logic of the smart eyewear apparatus 1 is run by the split-mount control device, the smart eyewear apparatus 1 may become smaller in size and lighter in weight; besides, use discomfort for users caused by over heat radiation of the smart eyewear apparatus 1 may be avoided.

The smart eyewear apparatus 1 is further configured for acquiring the user's determination information on the operation command and updating a corresponding training model for comprehensive logic analysis based on the operation command and the corresponding determination information. The smart eyewear apparatus 1 provides a function of defining an interaction operation, i.e., performing feature extraction and/or semantic analysis of the acquired input information based on an operation element corresponding to the operation command specified by the user, and finally outputting structured data (the structures of the structured data may be identical or different), establishes the structured data, establishes an association relationship between the structured data obtained from the analysis and the operation command specified by the user, and updates an existing set of rules or an existing machine learning model.

With reference to FIG. 5, specifically, the smart eyewear apparatus 1 further has a function of defining a user interaction operation.

Specifically, the smart eyewear apparatus 1 enters a state of defining an interaction operation based on user selection;

determines, based on the user selection, input information of a corresponding input module associated with a to-be-defined operation command, specifically comprising:

initiating a plurality of input modules, acquiring input information of a user-defined operation for each operation element, e.g., prompting the user a to-be-selected stage for an operation object; the user utters a voice "TV" to the microphone, or his gesture points to a "TV" entity in a real scene within a current view range, or selects, using a touch device, a "TV" entity in the real scene in a selected view range, etc.; for another example, in the to-be-selected stage of the user for an operation action, based on the voice input "turn on," a gesture input with a "turn on" implication, and a touch input with a "turn on" implication, etc.

next, extracts the input information of the user-defined operation for each operation element respectively using various channel technologies (e.g., image recognition, gesture identification, touch recognition, and voice recognition, etc.) to perform feature extraction and semantic analysis, and converts the input information into structured data;

finally, establishes a corresponding association for the structured data corresponding to the operation elements in respective operation types, generates a corresponding operation command, and updates the business logic corresponding to the respective operation command to an existing rule or model.

The user may autonomously define an interaction operation by acquiring relevant information of an operation command to be set by the user and updating the operation command based on the relevant information of the to-be-set operation command, which improves use flexibility for the user.

The smart eyewear apparatus 1 acquires relevant information of an operation command to be set by the user and updates the operation command based on the relevant information of the to-be-set operation command, which enables user to autonomously define an interaction operation and improves use flexibility for the user.

Compared with the prior art, the method for the smart eyewear apparatus to interact based on multimodal interaction and the smart eyewear apparatus according to the present disclosure enables a user to interact in a way more approximate to a natural language to thus improve user interaction experience by: acquiring multi-channel input information with a plurality of input modules, performing comprehensive logical analysis on the input information to determine operation elements such as an operation object, an operation action, and an operation parameter so as to generate an operation command, and then performing a corresponding operation based on the operation command, thereby performing in real time fusion processing to real scene information, virtual scene information, gesture information, voice information, touch information, and sensing information.

Further, the user may autonomously define an interaction operation by acquiring relevant information of an operation command to be set by the user and updating the operation command based on the relevant information of the to-be-set operation command, which improves use flexibility for the user.

Further, by providing a physically detached split-mount control device that is in communication connection with the smart eyewear apparatus in a wired or wireless manner, such that the processing core business logic of the smart eyewear apparatus is run by the split-mount control device, the smart eyewear apparatus may become smaller in size and lighter in weight; besides, use discomfort for users caused by over heat radiation of the smart eyewear apparatus may be avoided.

It should be noted that the present disclosure may be implemented in software and/or a combination of software and hardware; for example, it may be implemented by a application-specific integrated circuit (ASIC), a general-purpose computer, or any other similar hardware device. In one embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, a part of the present disclosure may be applied as a computer program product, for example, a computer program instruction, which, when executed by a computer, through the operation of the computer, may invoke or provide the method and/or technical solution according to the present disclosure. However, the program instructions invoking the method of the present disclosure may be stored in a fixed or removable recording medium, and/or transmitted through a data stream in broadcast or other signal bearer medium, and/or stored in the working memory of a computer device running according to the program instructions. Here, one embodiment according to the present disclosure includes a device, which includes a memory for storing computer program instructions and a processor for executing program instructions, wherein, when the computer program instructions are executed by the processor, the device is triggered to run the methods and/or technical solutions based on the previously mentioned multiple embodiments of the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

We claim:

1. A method for a smart eyewear apparatus to interact based on multimodal inputs, comprising:
    acquiring a plurality of input information from at least one of a plurality of input modules, the plurality of input modules including: an image input module, a voice input module, a touch input module, and a sensing input module, the plurality of input information including at least any one of: real scene information, virtual scene information, gesture information, voice information, touch information, and sensing information;
    performing, using corresponding processing modules, recognition pre-processing to the plurality of input information of the input modules respectively to generate a plurality of structured data, wherein the processing modules include a scene image recognition module, a gesture recognition module, a voice recognition module, a touch recognition module, or a sensing recognition module; and
    determining element types corresponding to the structured data; performing logic matching and/or arbitration selection to the structured data of a same element type to determine element information of the operation element corresponding to the element type; and if a combination of element information of the operation elements corresponding to the determined different element types complies with executing business logic, generating the operation command based on the element information of the corresponding operation element, wherein the operation command has operation elements, the operation elements at least including an operation object, an operation action, and an operation parameter; and
    performing a corresponding operation on the operation object based on the operation command.

2. The method according to claim 1, wherein performing, using corresponding processing modules, recognition pre-processing to the plurality of input information of the input modules respectively to generate a plurality of structured data, comprises at least any one of:
    recognizing, using the scene image recognition module, the virtual scene information and/or the real scene information inputted by the image input module to obtain structured data of a set of operable objects;
    recognizing, using the gesture recognition module, the gesture information inputted by the image input module to obtain a structured data of a set of operable objects and/or structured data of a set of operable actions;
    recognizing, using the touch recognition module, the touch information inputted by the touch input module to obtain at least any one of the following structured data: structured data of a position of a cursor on a screen, structured data of a set of operable actions, and structured data of input parameters; and
    recognizing, using the voice recognition module, the voice information inputted by the voice input module to obtain at least any one of the following structured data: structured data of a set of operable objects, structured data of a set of operable actions, and structured data of input parameters.

3. The method according to claim 1, wherein performing logic matching and/or arbitration selection to the structured data of a same element type to determine element information of the operation element corresponding to the element type, comprises:
    performing logic matching to the structured data of the same element type to determine at least one to-be-selected element information;
    performing arbitration selection to the to-be-selected element information to select one of them as selected element information; and
    determining the element information of the operation element corresponding to the element type based on the selected element information.

4. The method according to claim 3, further comprises:
    re-performing arbitration selection to the remaining to-be-selected element information so as to reselect one of them as selected element information when a combination of the element information of the determined operation elements corresponding to the different element types does not comply with executing business logic; and
    clearing the element information of the operation elements corresponding to all operation types when the duration of reselection exceeds an overtime or all of the combination of the element information determined for the to-be-selected element information does not comply with executing business logic.

5. The method according to claim 3, wherein performing arbitration selection to the to-be-selected element information to select one of them as selected element information, comprises:
    performing contention selection based on time orders and/or priority rankings of the to-be-selected element information; when the time orders and priority rankings of the to-be-selected element information are both identical, performing random selection to select one of them as the selected element information.

6. The method according to claim 3, wherein determining the element information of the operation element corresponding to the element type based on the selected element information, comprises:

determining whether there currently exists element information of the operation element corresponding to the element type;

in the case of existence, determining whether the priority of the selected element information is higher than the existing element information; and if yes, replacing the existing element information with the selected element information and determining the selected element information as the element information of the operation element corresponding to the element type.

7. The method according to claim 1, further comprises:
performing logic matching and arbitration selection to all of the structured data using a machine learning method so as to determine element information of the operation element corresponding to each of the element types, wherein the machine learning method includes at least one of: a decision tree method, a random forest method, and a convolutional neural network method.

8. The method according to claim 1, further comprises:
creating a deep learning neural network architecture model; and
inputting raw data of the input information into the deep learning neural network architecture model so as to be subjected to fusion processing and model operation, thereby generating an operation command.

9. The method according to claim 8, wherein the deep learning neural network architecture model is a convolutional neural network architecture model.

10. The method according to claim 1, further comprises:
transmitting the plurality of input information to a split-mount control device to perform comprehensive logic analysis so as to generate the operation command, wherein the split-mount control device is physically separated from a body of the smart eyewear apparatus and is in communication connection with the smart eyewear apparatus in a wired or wireless manner.

11. The method according to claim 1, further comprising:
acquiring relevant information of an operation command to be set by the user and updating the operation command based on the relevant information of the to-be-set operation command.

12. A non-transitory computer readable storage medium, including computer code, which, when being executed, causes a method according to claim 1 to be executed.

* * * * *